(12) United States Patent
Izumi et al.

(10) Patent No.: US 7,326,499 B2
(45) Date of Patent: Feb. 5, 2008

(54) ALKALINE STORAGE BATTERY

(75) Inventors: Yoichi Izumi, Moriguchi (JP); Tetsuo Nanno, Yao (JP); Hiroyuki Sakamoto, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 701 days.

(21) Appl. No.: 10/261,466

(22) Filed: Oct. 2, 2002

(65) Prior Publication Data

US 2003/0068560 A1  Apr. 10, 2003

(30) Foreign Application Priority Data

Oct. 4, 2001  (JP)  ............................. 2001-308130

(51) Int. Cl.
*H01M 8/10* (2006.01)

(52) U.S. Cl. ..................................... 429/309; 429/316

(58) Field of Classification Search ................ 429/309, 429/316, 317, 315, 59, 101, 218, 231.8, 231.95, 429/254, 142, 206, 211; 29/623.1, 623.5; 427/123; 420/400
See application file for complete search history.

(56) References Cited

U.S. PATENT DOCUMENTS

| | | | |
|---|---|---|---|
| 5,455,125 A * | 10/1995 | Matsumoto et al. ........... | 429/59 |
| 5,541,019 A | 7/1996 | Anani et al. | |
| 5,858,264 A * | 1/1999 | Ichino et al. ............... | 252/62.2 |
| 2002/0110738 A1* | 8/2002 | Takizawa et al. ............ | 429/317 |
| 2003/0091904 A1* | 5/2003 | Munshi ....................... | 429/309 |
| 2003/0124430 A1* | 7/2003 | Takizawa ..................... | 429/300 |

FOREIGN PATENT DOCUMENTS

| | | |
|---|---|---|
| JP | 62-249367 | 10/1987 |
| JP | 64-57568 | 3/1989 |
| JP | 05-121061 | 5/1993 |
| JP | 5-258767 | 10/1993 |
| JP | 06-267584 | 9/1994 |
| JP | 411086864 | * 5/1999 |

OTHER PUBLICATIONS

T. Keily et al., "Power Sources 12, Research and Development in Non-Mechanical Electrical Power Sources", Proceedings of the 16th International Power Sources Symposium held at Bournemouth, Sep. 1988, pp. 393-410.

* cited by examiner

*Primary Examiner*—Patrick Joseph Ryan
*Assistant Examiner*—Monique Wills
(74) *Attorney, Agent, or Firm*—McDermott Will & Emery LLP

(57) ABSTRACT

Disclosed is an alkaline storage battery comprising: a positive electrode comprising nickel hydroxide; a negative electrode; and an electrolyte layer interposed between the positive electrode and the negative electrode. The electrolyte layer comprises a water absorbent polymer and an aqueous alkaline solution. The water absorbent polymer is obtained by saponification of a copolymer comprising 100 parts by weight of monomer (A) and 0.01 to 10 parts by weight of monomer (B). The monomer (A) has at least one group capable of being converted to a carboxyl group by saponification and has one polymerizable double bond, and the monomer (B) has two or more polymerizable double bonds.

9 Claims, 1 Drawing Sheet ns. Each of these alkaline
ALKALINE STORAGE BATTERY

BACKGROUND OF THE INVENTION

As alkaline storage batteries, a nickel-cadmium storage battery, nickel-metal hydride storage battery, nickel zinc battery and the like are widely know storage batteries comprises a positive electrode comprising nickel hydroxide as an active material and a negative electrode comprising cadmium, hydrogen storage alloy or zinc, a separator and an electrolyte. Each of the separator and electrolyte is interposed between the positive electrode and the negative electrode. A non-woven fabric sheet comprising polyolefin is used for the separator, and a potassium hydroxide aqueous solution or the like is used for the electrolyte (Power Sources 12, Research and Development in Non-mechanical Electrical Power Sources, 1988, p. 393-410).

The alkaline storage batteries share a common problem that they have higher self-discharge than non-aqueous electrolyte secondary batteries. Particularly, in the case of the nickel-metal hydride storage battery, corrosion of the hydrogen storage alloy in the negative electrode causes the constituent elements of the alloy to dissolve into the electrolyte. The dissolved elements are able to freely migrate to the separator, the positive electrode and the like, thereby accelerating the self-discharge of the battery.

A method for improving the self-discharge characteristics of the nickel-metal hydride storage battery is disclosed in Japanese Unexamined Patent Publication No. Hei 1-57568. The publication proposes the use of a non-woven fabric sheet comprising sulfonated polyolefin for a separator.

The incorporation of a water absorbent polymer into the battery is proposed in Japanese Unexamined Patent Publication No. Hei 5-258767. This publication, however, discloses hardly any details of the water absorbent polymer.

In addition, the use of an electrolyte comprising a water absorbent polymer is disclosed in U.S. Pat. No. 5,541,019.

SUMMARY OF THE INVENTION

The present invention was achieved as a result of diligent studies on a water absorbent polymer used for an electrolyte layer. According to the present invention, the self-discharge of the alkaline storage batteries can be reduced and, preferably, the capacity recovery performance after storage of the alkaline storage batteries can be improved.

The present invention relates to an alkaline storage battery comprising: a positive electrode comprising nickel hydroxide; a negative electrode; and an electrolyte layer interposed between the positive electrode and the negative electrode.

The electrolyte layer comprises a water absorbent polymer and an aqueous alkaline solution.

The water absorbent polymer is obtained by saponification of a copolymer comprising 100 parts by weight of monomer (A) and 0.01 to 10 parts by weight of monomer (B).

The monomer (A) has at least one group capable of being converted to a carboxyl group by saponification, and has one polymerizable double bond.

The monomer (B) has two or more polymerizable double bonds.

It is preferable that the group capable of being converted to a carboxyl group by saponification is an alkoxycarbonyl group having 1 to 18 carbon atoms.

It is preferable that the monomer (A) is at least one selected from the group consisting of an alkyl acrylic acid ester (alkyl acrylate) and an alkyl methacrylic acid ester (alkyl methacrylate).

It is preferable that the monomer (B) is at least one selected from the group consisting of an aromatic hydrocarbon having two vinyl groups and an aliphatic hydrocarbon having two vinyl groups and one or more fluorine atoms.

It is preferable that the electrolyte layer further comprises a water repellent material.

The water repellent material preferably comprises at least one selected from the group consisting of a fluorinated carbon and a fluorocarbon resin.

It is preferable that the electrolyte layer further comprises a core member comprising a non-woven fabric sheet or woven fabric sheet. The non-woven fabric sheet or woven fabric sheet preferably comprises polyolefin or polyamide.

It is preferable that the electrolyte layer is in intimate contact with a surface of at least one of the positive electrode and the negative electrode.

It is preferable that the electrolyte layer further comprises an additive comprising at least one selected from the group consisting of polyethylene, polypropylene, carboxymethyl cellulose, styrene butadiene rubber and polyvinyl alcohol.

It is preferable that the electrolyte layer has a thickness of 20 to 200 μm.

It is preferable that an amount of the water absorbent polymer contained in the electrolyte layer per unit area is 1 to 20 g/m$^2$.

The present invention has a remarkable effect, particularly for a nickel-metal hydride storage battery which employs a negative electrode comprising a hydrogen storage alloy.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
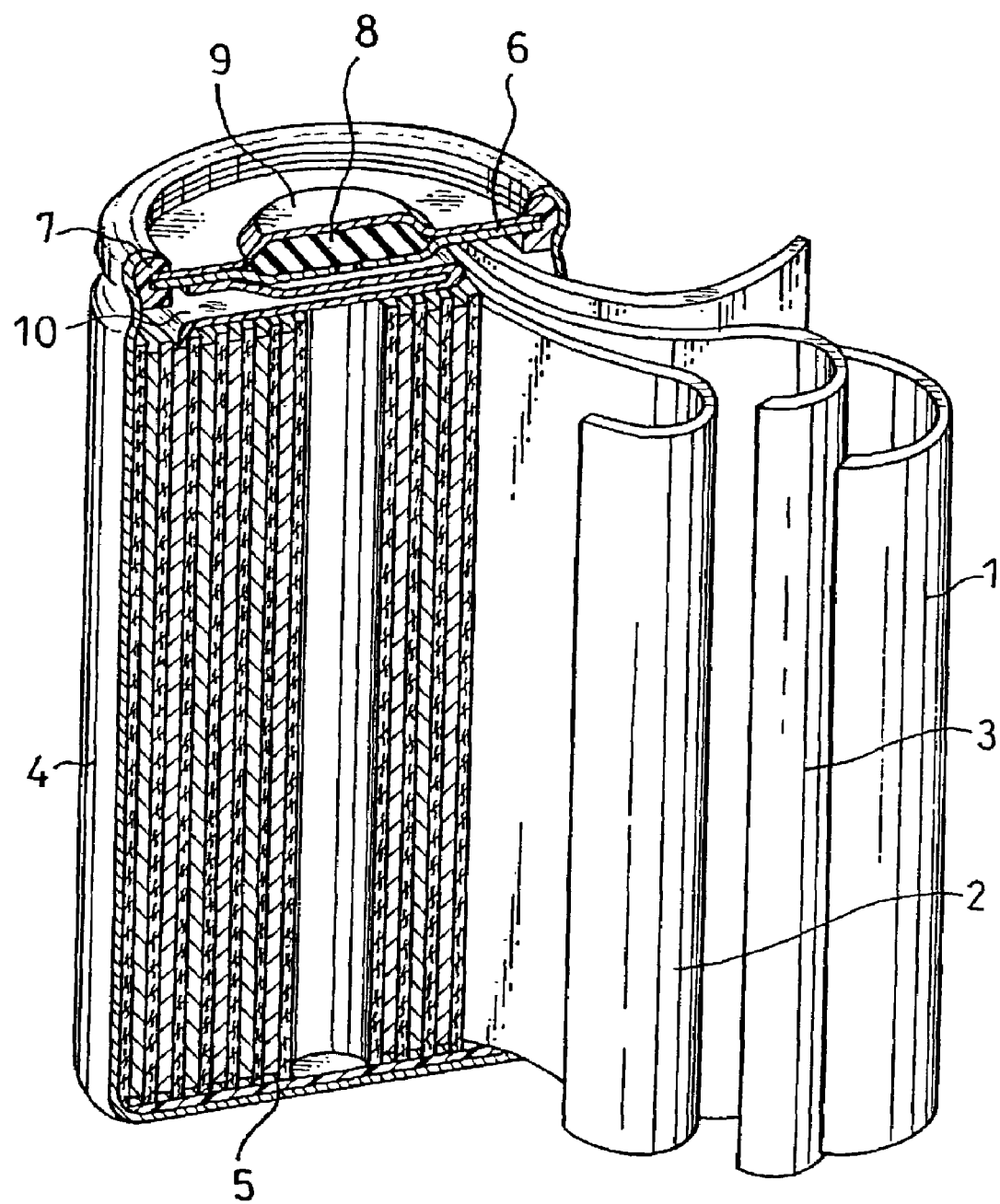
FIG. 1 is a longitudinal sectional oblique view of a sealed nickel-metal hydride storage battery as an example of the alkaline storage battery in accordance with the present invention.

The alkaline storage battery in accordance with the present invention comprises, between a positive electrode comprising nickel hydroxide and a negative electrode, an electrolyte layer comprising a water absorbent polymer and an aqueous alkaline solution. The water absorbent polymer is obtained by saponification of a predetermined copolymer. The copolymer is a product of polymerization of monomer (A) having at least one group capable of being converted to a carboxyl group by saponification and having one polymerizable double bond, and monomer (B) having two or more polymerizable double bonds.

Because the electrolyte layer contains an aqueous alkaline solution, it has a moderate ionic conductivity. Further, since the electrolyte layer contains a water absorbent polymer and thus is in the form of gel, it has an excellent ability to retain the aqueous alkaline solution and hence suppresses an increase of the internal resistance of the battery. Additionally, an electrolyte layer in the form of gel tends to suppress the self-discharge of the battery.

It is preferable that the group of monomer (A) capable of being converted to a carboxyl group by saponification is an alkoxycarbonyl group having, for example, 1 to 18, and more preferably 1 to 4 carbon atoms. Examples of such group include a methoxycarbonyl group, ethoxycarbonyl group and propoxycarbonyl group.

As monomer (A), for example, an alkyl acrylic acid ester, alkyl methacrylic acid ester or the like may be used. The alkyl acrylic acid ester may be, for example, methyl acrylate, ethyl acrylate or propyl acrylate. The alkyl methacrylic acid ester may be, for example, ethyl methacrylate, methyl methacrylate or propyl methacrylate. Any one of these may be used alone, or any two or more of these may be used in combination.

The polymerizable double bond of monomer (B) is preferably a vinyl group. As monomer (B), for example, an aromatic hydrocarbon having two vinyl groups or an aliphatic hydrocarbon having two vinyl groups and one or more fluorine atoms may be used. With the use of monomer (B), it is possible to produce a water absorbent polymer which is excellent, for example, in alkali resistance, oxidation resistance or durability.

The aromatic hydrocarbon having two vinyl groups may be, for example, divinylbenzene or divinylnaphthalene. The aliphatic hydrocarbon having two vinyl groups and one or more fluorine atoms may be, for example, divinylfluoroalkane such as divinyloctafluorobutane. Any one of these may be used alone, or any two or more of these may be used in combination.

In order to obtain the predetermined copolymer, it is preferable that 0.01 to 10 parts by weight, more preferably 0.05 to 5 parts by weight of monomer (B) is mixed with 100 parts by weight of monomer (A). Herein, a third monomer other than monomer (A) and monomer (B) may also be mixed with monomer (A) and monomer (B). In that case, the proper amount of the third monomer is not more than 10 parts by weight, per 100 parts by weight of monomer (A).

The third monomer is preferably a hydrophilic monomer. Examples of the hydrophilic monomer include acrylic acid, methacrylic acid, itaconic acid, fumaric acid, styrene sulfonic acid, hydroxyethyl acrylate, hydroxyethyl methacrylate, vihylpyridine, polyethylene glycol diacrylate and polyethylene glycol dimethacrylate.

When the amount of monomer (B) is less than 0.01 part by weight per 100 parts by weight of monomer (A), it is likely that the water absorbent polymer has low crosslinking density and thus dissolves into the aqueous alkaline solution in the battery. On the other hand, when the amount of monomer (B) is more than 10 parts by weight, the water absorbent polymer decreases its ability to retain the aqueous alkaline solution, so that it has a reduced effect of improving the self-discharge characteristics of the battery.

The copolymerization of monomer (A) and monomer (B) is preferably performed by dispersing, with stirring, monomer (A) and monomer (B) in water at 50° C. to 90° C. for 3 to 20 hours under inert gas atmosphere.

Examples of a polymerization initiator used herein include: peroxosulfate such as potassium peroxosulfate or ammonium peroxosulfate; hydrogen peroxide; and an azo compound such as 2,2'-azobisisobutyronitrile (AIBN).

The resultant copolymer is then subjected to saponification. Specifically, the resultant copolymer is immersed in a potassium hydroxide solution and allowed to stand at 25° C. to 80° C. for about 0.5 to 5 hours. The potassium hydroxide concentration in the solution used for the saponification is preferably 5 to 45 wt %. Additionally, as a solvent of the solution for the saponification, a mixed solvent comprising methanol and water at a volume ratio of 1:0.3 to 1:3 is preferably used. The saponified copolymer, that is, a water absorbent polymer, is washed with methanol, and dried and ground as needed.

The above-described method enables a homogeneous polymerization of monomer (A) and monomer (B), so that unreacted monomers are difficult to remain.

When the electrolyte layer further comprises a water repellent material, the electrolyte layer has an improved gas permeability and thus suppresses an increase of the inner pressure of the battery even when the battery is overcharged. As the water repellent material, a fluorinated carbon or fluorocarbon resin may be used, for example. These may be used alone, or may be used in combination. Fluorinated carbons are represented by the chemical formula: $CF_x$ ($x \leq 1$), and the fluorinated carbon represented by the formula: $CF_x$ ($x=1$) is commonly employed. As the fluorocarbon resin, polytetrafluoroethylene can be used, for example.

It is preferable that the electrolyte layer further comprises a reinforcing additive such as polyethylene, polypropylene, carboxymethyl cellulose, styrene butadiene rubber and polyvinyl alcohol, for the purpose of increasing the mechanical strength. These may be used alone, or may be used in combination.

The electrolyte layer may contain any conventionally used core member comprising a non-woven fabric sheet or woven fabric sheet. The non-woven fabric sheet or woven fabric sheet preferably comprises polyolefin or polyamide. With the use of such core member, it becomes possible to increase the tensile strength of the electrolyte layer, thereby improving the handleability thereof. For example, the electrolyte layer becomes more difficult to be damaged when it is laminated and spirally wound together with the positive electrode and negative electrode.

Herein, in the case of using the non-woven fabric sheet or woven fabric sheet itself as the separator as in the conventional methods, it is necessary to impart hydrophilicity to the non-woven fabric sheet or woven fabric sheet to improve the ability of the separator to retain aqueous liquid. On the other hand, in the case of using an electrolyte layer comprising a core member comprising a non-woven fabric sheet or woven fabric sheet impregnated with a water absorbent polymer, it is not necessary to impart hydrophilicity to the core member, since the water absorbent polymer is hydrophilic. Therefore, according to the present invention, the treatment to impart hydrophilicity to the core member can be omitted, thereby making it possible to reduce the manufacturing cost of the battery.

It is preferable that the above electrolyte layer has a thickness of 20 to 200 µm. When the thickness of the electrolyte layer is less than 20 µm, the mechanical strength of the electrolyte layer is likely to be reduced, inducing a problem such as the internal short-circuit of the battery. On the other hand, when the thickness of the electrolyte layer is more than 200 µm, the air permeability of the electrolyte layer is decreased or the internal resistance of the battery is increased. Further, it becomes difficult to achieve battery size reduction, which has been sought after in recent years.

When the above electrolyte layer has a core member, it is preferable that the amount of the water absorbent polymer, in the dry state, contained in the electrolyte layer per unit area is 1 to 20 $g/m^2$. When the amount of the water absorbent polymer contained in the above electrolyte layer is less than 1 $g/m^2$, the effect of the present invention cannot be sufficiently achieved. On the other hand, when it is more than 20 g/m², the gas permeability of the electrolyte layer is reduced to induce an increase in the inner pressure of the battery. When the electrolyte layer does not have a core member, the amount of the water absorbent polymer contained in the electrolyte layer per unit area may be appropriately adjusted, according to the desired strength and the like of the electrolyte layer.

The electrolyte layer is produced in the following manner, for example.

Firstly, a mixture of a water absorbent polymer and an aqueous alkaline solution is prepared, followed by gelation. For example, 200 to 2000 parts by weight of the aqueous alkaline solution is mixed, per 100 parts by weight of the water absorbent polymer. However, the mixing ratio of the alkaline solution differs depending on the type of the battery, the kind of the water absorbent polymer and the like, and is therefore not limited to the above ratio.

It is preferable that the aqueous alkaline solution has a specific gravity of 1.1 to 1.4 g/cm³. To the mixture comprising the water absorbent polymer and the aqueous alkaline solution, the above-described water repellent material and/or reinforcing additive may be added as needed.

The proper amount of the water repellent material to be added per 100 parts by weight of the total of the water absorbent polymer and the aqueous alkaline solution is 0.1 to 8 parts by weight. When the amount of the water repellent material is less than 0.1 part by weight, the effect of suppressing an inner pressure increase of the battery during quick charging is reduced. On the other hand, when the amount of the water repellent material is more than 8 parts by weight, the discharge characteristics may occasionally degrade.

The proper amount of the reinforcing additive to be added per 100 parts by weight of the total of the water absorbent polymer and the aqueous alkaline solution is 0.1 to 2 parts by weight. When the amount of the reinforcing additive is less than 0.1 part by weight, the effect of increasing the mechanical strength of the electrolyte layer is reduced. On the other hand, when the amount of the reinforcing additive is more than 2 parts by weight, the cycle life characteristics of the battery may be occasionally impaired.

Next, the mixture thus obtained is applied, in a uniform thickness, to the surface of a substrate having a smooth surface such as a glass plate, dried to some degree, and then peeled off from the substrate to give a film-like electrolyte layer.

Alternatively, the above-described mixture may be impregnated in or applied to a non-woven fabric sheet or woven fabric sheet, and then dried to form an electrolyte layer having a core member.

Alternatively, the above-described mixture may be applied to either one surface or both surfaces of one of the positive electrode and the negative electrode, thereby forming the electrolyte layer integral with the electrode plate.

In the following, by referring to FIG. 1, descriptions will be made on a method of producing a nickel-metal hydride storage battery as an example of the alkaline storage battery in accordance with the present invention. FIG. 1 is a longitudinal sectional view of a cylindrical nickel-metal hydride storage battery.

A positive electrode 1 contains nickel hydroxide as an active material, and a negative electrode 2 contains a hydrogen storage alloy. An electrolyte layer 3, which is interposed between the positive electrode 1 and the negative electrode 2, comprises a water absorbent polymer and an aqueous alkaline solution, and may also contain a water repellent material, a reinforcing additive, a core member and the like, as described above.

The positive electrode 1 and the negative electrode 2 may be produced in the same manner as in the conventional methods. The positive electrode 1 and the negative electrode 2 are produced by applying, respectively, a positive electrode material mixture and a negative electrode material mixture onto a current collector such as metal foil or expanded metal, and they are usually in a strip shape immediately after the production.

The positive electrode 1 and the negative electrode 2 are laminated, with the electrolyte layer 3 interposed therebetween, and the whole structure is spirally wound to form an electrode assembly. The electrode assembly is placed, together with an alkaline electrolyte, in a case 4 having an insulating plate 5 disposed on the bottom thereof. In order to prevent misalignment between the electrode plate and the electrolyte layer when laminating and spirally winding them during the assembly step of the battery, it is preferable to previously form the electrolyte layer integral with the electrode plate, as described above.

The opening of the case 4 is sealed with a sealing plate 6 having a positive electrode terminal 9. The sealing plate 6 comprises a vent for connecting the inside and outside of the case 4. The sealing plate 6 further comprises a safety valve made of rubber 8 for blocking the vent. When gas is generated inside the battery to increase the internal pressure of the battery, the rubber 8 becomes deformed to release the gas via the vent connecting the inside and outside of the case 4. At the periphery of the sealing plate 6, an insulating gasket 7 is disposed so as to electrically insulate a positive electrode terminal 9 from the case 4, which will later serve as a negative electrode terminal.

Disposed at the top portion of the electrode assembly is a positive electrode current collecting member 10. The positive electrode current collecting member 10 is connected to each of the sealing plate 6 and the positive electrode 1. On the other hand, a part of the negative electrode 2 located at the outermost periphery of the electrode assembly is connected to the inside of the case 4, which is made of metal. The outer surface of the case 4 is covered with an insulating material, and the bottom portion of the case serves as a negative electrode terminal.

In the following, the present invention will be described in detail with reference to examples.

EXAMPLE 1

(i) Production of Positive Electrode

Nickel hydroxide containing Co and Zn was used as a positive electrode active material. To 100 parts by weight of the active material, 10 parts by weight of cobalt hydroxide was added, which was further added with water and mixed. Subsequently, the mixture thus obtained was filled into pores of a foamed nickel sheet having a thickness of 1.2 mm. The formed nickel sheet filled with the mixture was dried, rolled and cut, thereby producing a positive electrode. Additionally, a positive electrode lead is attached to the positive electrode.

(ii) Production of Negative Electrode

A known $AB_5$ type hydrogen storage alloy was used as a negative electrode material. The alloy was pulverized into a mean particle size of 35 µm, followed by alkali treatment. To the alloy powder thus treated, carboxymethyl cellulose as a binder and water were added, and the whole was mixed.

Subsequently, the obtained mixture was applied onto a nickel-plated punched metal substrate. The substrate applied with the mixture was rolled and cut, thereby forming a negative electrode.

(iii) Production of Electrolyte Layer 70 g of methyl acrylate, 3 g of sodium styrenesulfonate, 3.7 g of divinylbenzene, 1.5 g of potassium peroxosulfate and 550 g of water were mixed together. The mixture thus obtained was heated, with stirring, at 70° C. for eight hours under nitrogen gas atmosphere to polymerize methyl acrylate and divinylbenzene.

The resultant copolymer was immersed in a mixed solution comprising 51 wt % methanol, 34 wt % water and 15 wt % potassium hydroxide, and the solution was allowed to stand at 65° C. for two hours to saponify the copolymer. Thereafter, the saponified copolymer was washed with methanol, dried and pulverized to produce a water absorbent polymer.

10 g of the water absorbent polymer thus obtained was mixed with 125 g of a potassium hydroxide aqueous solution having a specific gravity of 1.25 g/cm$^3$ and 0.1 g of carboxymethyl cellulose, followed by gelation. The resultant gel was applied onto a smooth surface of a glass plate, dried and then peeled off from the glass plate to give a film. The film thus obtained was rolled into a thickness of 150 μm and then cut, thereby producing an electrolyte layer.

(iv) Assembling of Battery

The positive electrode and the negative electrode were laminated, with the electrolyte layer interposed therebetween, and spirally wound to form an electrode assembly. An insulating plate was disposed at the bottom portion of the electrode assembly, and the whole structure was placed in an AA-size case. Subsequently, a potassium hydroxide aqueous solution having a specific gravity of 1.3 g/cm$^3$ was injected into the case as an electrolyte. Then, an insulating plate was placed on the top of the electrode assembly. The opening of the case was sealed with a sealing plate having a positive electrode terminal and a safety valve and being provided with a gasket disposed at the peripheral portion thereof. Prior to sealing the case, a positive electrode lead was connected to the sealing plate. In this manner, a sealed battery having a nominal capacity of 1200 mAh in an initial state was completed. This battery was named Battery A.

(v) Evaluation of Battery (a) Self-Discharge Characteristics

Battery A was charged at 20° C. at 120 mA for 15 hours and then discharged at 20° C. at 240 mA, and it was determined that the discharge capacity was 1200 mAh. Herein, the end-of-discharge voltage was set at 1 V.

Battery A was re-charged at 20° C. at 120 mA for 15 hours, and then stored at 50° C. for 15 days. Subsequently, Battery A was discharged at 20° C. at 240 mA to determine the discharge capacity. Thereafter, the ratio of the discharge capacity reduced during storage at 50° C. to the initial discharge capacity was determined by percentage. The obtained value was considered as the self-discharge rate. The self-discharge rate of Battery A was 25%.

(b) Capacity Recovery Rate

After the measurement of the self-discharge rate, storage test was performed on Battery A. Again, Battery A was charged at 20° C. at 120 mA for 15 hours and then discharged at 20° C. at 240 mA until the battery voltage dropped to 1.0 V, thereby determining the discharge capacity.

Subsequently, Battery A was stored at 65° C. for 40 days. Thereafter, Battery A was charged at 20° C. at 120 mA for 15 hours and then discharged at 20° C. at 240 mA until the battery voltage dropped to 1.0 V to determine the discharge capacity. Then, the ratio of the discharge capacity after storage at 65° C. to the discharge capacity before storage was determined by percentage. The obtained value was considered as the capacity recovery rate. The capacity recovery rate of Battery A was 94%.

EXAMPLE 2

10 g of the water absorbent polymer produced in Example 1 was mixed with 125 g of a potassium hydroxide aqueous solution having a specific gravity of 1.25 g/cm$^3$ and 0.1 g of carboxymethyl cellulose, followed by gelation. The resultant gel was applied onto a non-woven fabric sheet (thickness: 120 μm) comprising sulfonated polypropylene, and then dried to produce an electrolyte layer comprising water absorbent polymer and a non-woven fabric sheet as a core member and having a thickness of 150 μm. Herein, the amount of the water absorbent polymer contained in the electrolyte layer per unit area was set at 6 g/m$^2$. Except for the use of the above-described electrolyte layer, a sealed battery was produced in the same manner as in Example 1. The battery thus produced was named Battery B. Subsequently, Battery B was evaluated in the same manner as in Example 1. As a result, the self-discharge rate of Battery B was 23% and the capacity recovery rate thereof was 95%.

COMPARATIVE EXAMPLE 1

A sealed battery was produced in the same manner as in Example 1 except that a non-woven fabric sheet comprising sulfonated polypropylene itself was used as the separator, in place of the electrolyte layer produced in Example 1. The battery thus produced was named Battery C. Subsequently, Battery C was evaluated in the same manner as in Example 1. As a result, the self-discharge rate of Battery C was 35% and the capacity recovery rate thereof was 92%. That is to say that the self-discharge rate of Battery C was inferior to those of Batteries A and B by 10% or more.

From the above, it was found that Batteries A and B had self-discharge characteristics far superior to those of the conventional Battery C. Further, since the capacity recovery rate of Battery C was 92%, it was proved that Batteries A and B of the present invention also had a capacity recovery rate superior to that of the conventional Battery C.

Although the cause of the superior storage characteristics of Batteries A and B was not known in detail, it was presumably because the dissolution of the hydrogen storage alloy of the negative electrode into the electrolyte and the migration of the dissolved elements to the positive electrode were suppressed.

EXAMPLE 3

The mixing ratio of methyl acrylate and divinylbenzene in the preparation of the water absorbent polymer was investigated as follows. Water absorbent polymers were prepared in the same manner as in Example 1 except that the amount of divinylbenzene was changed from 3.7 g to predetermined amounts ranging from 0.0007 g to 14 g. Then, with the use of the thus obtained water absorbent polymers, sealed batteries were produced in the same manner as in Example 1, and the self-discharge rate and capacity recovery rate of each battery were similarly determined. The self-discharge rates are shown in TABLE 1.

TABLE 1

| Amount of divinylbenzene | | Self-discharge rate |
|---|---|---|
| (part by weight) | (g) | (%) |
| 0.001 | 0.0007 | 35 |
| 0.005 | 0.0035 | 33 |
| 0.01 | 0.007 | 28 |
| 0.05 | 0.035 | 25 |
| 0.1 | 0.07 | 25 |
| 0.5 | 0.35 | 23 |
| 1 | 0.7 | 25 |
| 5 | 3.5 | 23 |
| 10 | 7 | 27 |
| 15 | 10.5 | 34 |
| 20 | 14 | 35 |

As is evident from TABLE 1, when the amount of divinylbenzene was less than 0.01 part by weight (0.007 g) or more than 10 parts by weight (7 g), per 100 parts by weight of methyl acrylate, no significant improvement was observed in the self-discharge characteristics of the battery. The reason was presumably as follows. When the amount of divinylbenzene was less than 0.01 part by weight, the cross-linking density of the water absorbent polymer was reduced to cause the saponified copolymer to be dissolved into the alkaline electrolyte. When the amount of divinylbenzene was more than 10 parts by weight, the cross-linking density of the water absorbent polymer was excessively increased to reduce the ability of the water absorbent polymer to retain the alkaline electrolyte, so that the water absorbent polymer did not sufficiently serve its function as gel.

When the amount of divinylbenzene was 0.01 to 10 parts by weight per 100 parts by weight of methyl acrylate, the capacity recovery rate was 93 to 95%, showing the overall improvement in the results. In contrast, when the amount of divinylbenzene was less than 0.01 part by weight or more than 10 parts by weight, the capacity recovery rate was 90 to 92%, so that no improvement was observed in the capacity recovery rate.

From the above, it was understood that the proper amount of monomer (B) to be mixed was 0.01 to 10 parts by weight, per 100 parts by weight of monomer (A).

EXAMPLE 4

A sealed battery was produced in the same manner as in Example 1 except that 70 g of ethyl acrylate was used in place of 70 g of methyl acrylate and that the amount of divinylbenzene was changed from 3.7 g to 0.07 g (0.1 part by weight) in the production of the electrolyte layer. The battery thus produced was named Battery D. Subsequently, Battery D was evaluated in the same manner as in Example 1. The results are shown in TABLE 2.

EXAMPLE 5

A sealed battery was produced in the same manner as in Example 1 except that 70 g of methyl methacrylate was used in place of 70 g of methyl acrylate and that the amount of divinylbenzene was changed from 3.7 g to 0.07 g (0.1 part by weight) in the production of the electrolyte layer. The battery thus produced was named Battery E. Subsequently, Battery E was evaluated in the same manner as in Example 1. The results are shown in TABLE 2.

EXAMPLE 6

A sealed battery was produced in the same manner as in Example 1 except that 70 g of ethyl itaconate was used in place of 70 g of methyl acrylate and that the amount of divinylbenzene was changed from 3.7 g to 0.07 g (0.1 part by weight) in the production of the electrolyte layer. The battery thus produced was named Battery F. Subsequently, Battery F was evaluated in the same manner as in Example 1. The results are shown in TABLE 2.

EXAMPLE 7

A sealed battery was produced in the same manner as in Example 1 except that 0.07 g (0.1 part by weight) of divinylnaphthalene was used in place of 3.7 g of divinylbenzene in the production of the electrolyte layer. The battery thus produced was named Battery G. Subsequently, Battery G was evaluated in the same manner as in Example 1. The results are shown in TABLE 2.

EXAMPLE 8

A sealed battery was produced in the same manner as in Example 1 except that 0.07 g (0.1 part by weight) of 1,4-divinyloctafluorobutane was used in place of 3.7 g of divinylbenzene in the production of the electrolyte layer. The battery thus produced was named Battery H. Subsequently, Battery H was evaluated in the same manner as in Example 1. The results are shown in TABLE 2.

TABLE 2

| | Monomer (A) | | Monomer (B) | | |
|---|---|---|---|---|---|
| Battery | Type | part by weight | Type | part by weight | Self-discharge rate (%) |
| D | ethyl acrylate | 100 | divinylbenzene | 0.1 | 25 |
| E | methyl methacrylate | 100 | divinylbenzene | 0.1 | 27 |
| F | ethyl itaconate | 100 | divinylbenzene | 0.1 | 27 |
| G | methyl acrylate | 100 | divinylnaphthalene | 0.1 | 26 |
| H | methyl acrylate | 100 | 1,4-divinyloctafluorobutane | 0.1 | 28 |

As can be seen from TABLE 2, the self-discharge rate was also suppressed in the batteries employing various water absorbent polymers synthesized from various combinations of monomer (A) and monomer (B) in the electrolyte layer. Further, since the batteries also had a good capacity recovery rate after storage, the above-described water absorbent polymers were considered to be excellent in alkali resistance, oxidation resistance and the like.

Although the nickel-metal hydride storage battery was used as an example of the alkaline storage batteries in the above-described examples, the present invention is not limited to the nickel-metal hydride storage battery, but is considered to achieve similarly excellent characteristics in other types of alkaline storage batteries.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An alkaline storage battery comprising: a positive electrode comprising nickel hydroxide; a negative electrode; and an electrolyte layer interposed between said positive electrode and said negative electrode,
   said electrolyte layer comprising a water absorbent polymer and an aqueous alkaline solution,
   said water absorbent polymer being obtained by saponification of a copolymer comprising 100 parts by weight of monomer (A) and 0.01 to 10 parts by weight of monomer (B),
   said monomer (A) is at least one selected from the group consisting of an alkyl acrylic acid ester and an alkyl methacrylic acid ester, and
   said monomer (B) is at least one selected from the group consisting of an aromatic hydrocarbon having two vinyl groups and an aliphatic hydrocarbon having two vinyl groups and one or more fluorine atoms.

2. The alkaline storage battery in accordance with claim 1, wherein said at least one selected from the group consisting of an alkyl acrylic acid ester and an alkyl methacrylic acid ester has 1 to 18 carbon atoms.

3. The alkaline storage battery in accordance with claim 1, wherein said electrolyte layer further comprises a water repellent material comprising at least one selected from the group consisting of a fluorinated carbon and a fluorocarbon resin.

4. The alkaline storage battery in accordance with claim 1, wherein said electrolyte layer further comprises a core member comprising a non-woven fabric sheet or woven fabric sheet, said non-woven fabric sheet or said woven fabric sheet comprising polyolefin or polyamide.

5. The alkaline storage battery in accordance with claim 1, wherein said electrolyte layer is in intimate contact with a surface of at least one of said positive electrode and said negative electrode.

6. The alkaline storage battery in accordance with claim 1, wherein said electrolyte layer further comprises an additive comprising at least one selected from the group consisting of polyethylene, polypropylene, carboxymethyl cellulose, styrene butadiene rubber and polyvinyl alcohol.

7. The alkaline storage battery in accordance with claim 1, wherein said electrolyte layer has a thickness of 20 to 200 µm.

8. The alkaline storage battery in accordance with claim 4, wherein an amount of said water absorbent polymer contained in said electrolyte layer per unit area is 1 to 20 g/m².

9. The alkaline storage battery in accordance with claim 1, wherein said negative electrode comprises a hydrogen storage alloy.

* * * * *